(12) United States Patent
Beska et al.

(10) Patent No.: US 11,325,548 B2
(45) Date of Patent: May 10, 2022

(54) HEATING MAT WITH ELECTRIC CONTROL UNIT INTEGRATED CONNECTOR

(71) Applicant: GENTHERM GMBH, Odelzhausen (DE)

(72) Inventors: Jan Beska, Belle River (CA); Miao Xu, Shanghai (CN); Dusko Petrovski, Rochester, MI (US)

(73) Assignee: GENTHERM GMBH, Odelzhausen (DE)

( * ) Notice: Subject to any disclaimer, the term of this patent is extended or adjusted under 35 U.S.C. 154(b) by 333 days.

(21) Appl. No.: 16/614,868

(22) PCT Filed: May 10, 2018

(86) PCT No.: PCT/IB2018/000861
§ 371 (c)(1),
(2) Date: Nov. 19, 2019

(87) PCT Pub. No.: WO2018/224889
PCT Pub. Date: Dec. 13, 2018

(65) Prior Publication Data
US 2020/0276948 A1    Sep. 3, 2020

(30) Foreign Application Priority Data
Jun. 9, 2017    (CN) .......................... 201710432942.0

(51) Int. Cl.
*B60R 16/03*        (2006.01)
*B60N 2/56*         (2006.01)
(Continued)

(52) U.S. Cl.
CPC ............ *B60R 16/03* (2013.01); *B60N 2/5678* (2013.01); *B62D 1/06* (2013.01); *H05B 1/0236* (2013.01); *H05B 1/0238* (2013.01)

(58) Field of Classification Search
CPC ... B60R 16/03; B60R 16/0238; B60N 2/5678; B60D 1/06; H05B 1/0236; H05B 1/0238;
(Continued)

(56) References Cited

U.S. PATENT DOCUMENTS 5,879,173 A    3/1999 Poplawski et al.
6,201,704 B1    3/2001 Poplawski et al.
(Continued)

FOREIGN PATENT DOCUMENTS

CN        2148404 Y    12/1993
CN        2449380 Y    9/2001
(Continued)

OTHER PUBLICATIONS

Chinese Office Action for Chinese Application 201710432942.0; dated Sep. 28, 2020.
(Continued)

*Primary Examiner* — Shawntina T Fuqua
(74) *Attorney, Agent, or Firm* — The Dobrusin Law Firm, P.C.

(57) ABSTRACT

An electric control unit comprising: (a) a plurality of input wires; (b) a connector receiving the plurality of input wires on a first side, the first side of the connector including: (i) a plurality of slots that each receive one of the plurality of wires and (ii) a plurality of prongs having an alternating relationship with the plurality of slots so that the plurality of prongs and the plurality of slots support each of the plurality of input wires; and (c) control circuitry located within the connector and connected to each of the plurality of input wires; and (d) a plurality of output pins located on a second side of the connector that are configured to connect to a thermal element so that the electric control unit assists in powering the thermal element and controlling the thermal element.

15 Claims, 5 Drawing Sheets

(51) Int. Cl.
  *B62D 1/06* (2006.01)
  *H05B 1/02* (2006.01)
(58) Field of Classification Search
  CPC .... H05B 1/02; H01R 13/506; H01R 13/6658;
  H01R 13/6683; H01R 24/30; H01R
  2201/26; H01R 13/00; H01R 2107/00;
  H01R 4/36; H01R 12/515; H05K 1/0262;
  H05K 1/0256; H05K 2201/09727; H05K
  2201/09972; H05K 3/222; H05G 3/088;
  A61H 33/005
  See application file for complete search history.

(56) References Cited

U.S. PATENT DOCUMENTS

| | | | |
|---|---|---|---|
| 6,371,793 | B1 | 4/2002 | Doorhy et al. |
| 7,090,509 | B1 | 8/2006 | Gilliland et al. |
| 8,626,087 | B2 | 1/2014 | Vanderaa |
| 2002/0017517 | A1 | 2/2002 | Li |
| 2002/0076969 | A1 | 6/2002 | Baier et al. |
| 2003/0181092 | A1 | 9/2003 | Negishi et al. |
| 2004/0070911 | A1 | 4/2004 | Tran |
| 2006/0274467 | A1 | 12/2006 | Nagasawa |
| 2008/0041842 | A1 | 2/2008 | Alexander et al. |
| 2010/0167579 | A1 | 7/2010 | Hayauchi |
| 2011/0021061 | A1 | 1/2011 | Bishop et al. |
| 2015/0309955 | A1 | 10/2015 | Fan et al. |

FOREIGN PATENT DOCUMENTS

| | | |
|---|---|---|
| CN | 1933243 A | 3/2007 |
| CN | 101507052 A | 8/2009 |
| CN | 201352634 Y | 11/2009 |
| CN | 201708364 U | 1/2011 |
| CN | 101969169 A | 2/2011 |
| CN | 202737285 U | 2/2013 |
| DE | 19703675 A1 | 8/1998 |
| DE | 102015101868 A1 | 8/2015 |
| JP | S5896007 A | 6/1983 |
| JP | S603683 A | 1/1985 |
| JP | H08-145019 A | 6/1996 |
| JP | H10-021995 A | 1/1998 |
| JP | 2001-223039 A | 8/2001 |
| JP | 2004-516627 A | 6/2004 |
| JP | 2004-306848 A | 11/2004 |
| JP | 2008-053096 A | 3/2008 |
| JP | 2011-141991 A | 7/2011 |
| JP | 2015-227088 A | 12/2015 |
| JP | 2016-502710 A | 1/2016 |
| JP | 2016-022826 A | 2/2016 |
| WO | 2015/004132 A1 | 1/2015 |

OTHER PUBLICATIONS

Japanese Office Action for Japanese Application 2019-567659, dated Feb. 1, 2021.
Notice of Decision to Grant dated May 14, 2021, for Korean Patent Application No. 10-2020-7000461.
International Search Report and Written Opinion for International Application PCT/IB2018/000861, dated Nov. 27, 2018.
Third Chinese Office Action dated Oct. 9, 2021, for Chinese Application No. 201710432942.0.
English Translation of the Notice Requesting Submission of Opinion dated Mar. 8, 2021, for Korean Patent Application No. 10-2020-7000461.

HEATING MAT WITH ELECTRIC CONTROL UNIT INTEGRATED CONNECTOR

FIELD

The present teachings generally relate to an electric control unit that includes control circuitry and specifically to an electric control unit including control circuitry that provides power and control signals to a thermal element such as a heating mat.

BACKGROUND

Currently, multiple different types of wire harnesses are available to provide power and signals to componentry such as electric vehicle components. These wire harnesses may carry power from a power source to one or more components so that the components can be operated. Other wire harnesses carry signals so that components can be controlled by a remote controller. Some wire harnesses carry both power and signals so that the wire harness can be used to connect the componentry to a controller and power source. Attempts have been made to integrate a control box within the wire harness so that the wire harness can both control and power one or more components. Examples of wire harnesses and modules may be found in U.S. Pat. Nos. 5,879,173; 6,201,704; 6,371,793; 7,090,509; and 8,626,087 all of which are incorporated by reference herein for all purposes.

What is needed is an electric control unit that is both a plug and a controller. It would be attractive to have an electric control unit that includes a connector including a printed circuit board. What is needed is a connector that supports a plurality of wires that connect with a printed circuit board within the connector. It would be attractive to have a connector that receives a plurality of both power wires and signal wires and the power wires are configured so that capacitive coupling is minimized and/or prevented within the electric control unit and the connector of the electric control unit.

SUMMARY

The present teachings meet one or more (if not all) of the present needs by providing: an electric control unit comprising: (a) a plurality of input wires; (b) a connector receiving the plurality of input wires on a first side, the first side of the connector including: (i) a plurality of slots that each receive one of the plurality of wires and (ii) a plurality of prongs having an alternating relationship with the plurality of slots so that the plurality of prongs and the plurality of slots support each of the plurality of input wires; and (c) control circuitry located within the connector and connected to each of the plurality of input wires; and (d) a plurality of output pins located on a second side of the connector that are configured to connect to a thermal element so that the electric control unit assists in powering the thermal element and controlling the thermal element.

The teachings herein surprisingly solve one or more of these problems by providing an electric control unit that is both a plug and a controller. The present teachings provide an electric control unit that includes a connector including a printed circuit board. The present teachings provide a connector that supports a plurality of wires that connect with a printed circuit board within the connector. The present teachings provide a connector that receives a plurality of both power wires and signal wires and the power wires are configured so that capacitive coupling is minimized and/or prevented within the electric control unit and the connector of the electric control unit.

DETAILED DESCRIPTION

The explanations and illustrations presented herein are intended to acquaint others skilled in the art with the invention, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The present teachings relate to a thermal conditioning system and more preferably a thermal conditioning system that has an electric control unit integrated into connective wiring of the thermal conditioning system. The thermal conditioning system may function to provide heat, cooling, ventilation, or a combination thereof. The thermal conditioning system may include a thermoelectric device. The thermal conditioning system may include a fan or blower. The thermal conditioning system may include a one or more thermal elements that provide heat. The thermal conditioning seat may be located within a vehicle (e.g., car, truck, van, bus, semi-truck, airplane, boat). Preferably, the thermal conditioning seat may be located within an automotive vehicle. Preferably, the thermal conditioning system includes a portion that is located within or adjacent an occupant contact area such as within a seat, steering wheel, floor, door panel, arm rest, head liner, or any other panel that an occupant contacts. The thermal conditioning system includes one or more thermal elements.

The thermal elements may function to produce heat, cool, or both. The thermal elements may be a thermoelectric device, blower, fan, resistive heater, heating wire, or a combination thereof. A plurality of thermal elements may be connected to one electric control unit. For example, a thermoelectric device may be located within a blower and the electric control unit may be connected to both the thermoelectric device and the blower. The thermoelectric elements may each be connected to an individual electric control unit. Preferably, the thermal elements are a heater.

The thermal element may be secured directly to the trim layer, the cushion (i.e., bun, back, or both) of the seat, or a combination of both. The thermal element may be used with or as a passenger sensor. The thermal element may function as a passenger sensor (e.g., the heater may both provide heat and sensing capabilities). The heater may be placed over and/or under a passenger senor. The passenger sensor may be any type of passenger sensor that senses the presence of a passenger. The passenger sensor may be a capacitive sensor, a pressure sensor, a membrane sensor, infrared, passive and/or active ultrasonic sensor, a mass sensor, or a combination thereof. The passenger sensor may be connected to an electric control unit. The passenger sensor may be part of the thermal conditioning system. The thermal element and a passenger sensor may be used with an active cooling system, active heating system, a ventilated system, or a combination thereof. The thermal element may be a resistive substrate. The resistive substrate may be formed as a sheet. The resistive substrate is a nonwoven material. The thermal element may be a heating wire. The thermal element may be a positive temperature coefficient material (e.g., silver buses with a printed resistive layer including carbon. The thermal element may be measured by one or more thermal sensors.

The one or more thermal sensors may be one or more thermistors, one or more negative coefficient resistors, one or more positive temperature coefficient resistors, or a combination thereof. The one or more thermistors function to measure a temperature of the heater, the resistive substrate, or both. The one or more thermistors may be in direct contact with a thermal element. The one or more thermistors may extend along a surface of the thermal element; within a component of the thermal conditioning system; within a vehicle component (e.g., a seat or steering wheel); or a combination thereof. The one or more thermistors may provide measurements to a controller and the controller may regulate the temperature of the heater. The one or more thermal sensors may be located within or connected to the electric control unit.

The electric control unit may function to connect one or more thermal elements to a power source, a controller, a signal source, or a combination thereof. Preferably, the electric control unit connects the one or more thermal elements to a power source and supplies signals or control signals to the thermal elements. The electric control unit may power control circuitry and provide both power and signals to one or more thermal elements. The electric control unit may be directly connected to one or more thermal elements. The electric control unit may be located within a thermal conditioning system. For example, the electric control unit may connect to a heater and the electric control unit and heater may be located within a steering wheel or a seat of an automobile. The electric control unit may include a plurality of input wires and a plurality of output pins.

The input wires function to provide power, signals, or both to the electric control unit, the thermal elements, or both. The input wires may be located on a first end of the electric control unit, the connector, or both. The input wires may extend through a connector, slots of a connector, or both. The input wires may connect to a printed circuit board. The input wires may provide power, signals, or both (e.g., some input wires may be power wires and some input wires may be signal wires). The input wires may include a dielectric coating. The input wires may have a portion of the dielectric coating removed where the input wires connect to the printed circuit board. The input wires may have a bare wire that extends above the printed circuit board. The bare wire may be connected to the printed circuit board via solder. The solder may both physically and electrically connect the input wires to the printed circuit board. The power wires and signal wires may extend through the connector in any configuration so that the power wires and signal wires provide both power and signals to the electric control unit. The power wires may be located between the signal wires. Preferably, the signal wires are located between and separate the power wires.

The power wires may function to provide power to the electric control unit, a printed circuit board, the thermal elements, or a combination thereof. The power wires may include a positive wire and a negative wire. The power wires may be an ignition wire and a ground wire. The power wires may be located on opposite sides of the connector. The power wires may be separated by one or more signal wires and preferably two signal wires. For example, one power wire may be located on a first edge region of the connector, two or more signal wires may be located in a center, and then a second power wire may be located in a second edge region of the connector.

The signal wires may function to provide an input from a user, a controller, a sensor, or a combination thereof to the electric control unit, the printed circuit board, a motor control unit, or a combination thereof. The signal wires may extend between a sensor and the electric control unit. The signal wires may extend between a user input (e.g., a temperature setting) and the electric control unit. The signal wires may provide an on signal or an off signal. The signal wires may provide information (e.g., input information) to the control circuitry and the control circuitry may provide information (e.g., output information) to the output pins that are connected to one or more thermal elements.

The output pins may function to connect the electric control unit to one or more thermal elements. The output pins may extend into a receiver of the thermal elements or vice versa to form a mating connection. The output pins may provide the power, signals, or both from the electric control unit to the thermal elements. The output pins may provide power to the thermal elements so that the thermal elements produce heat or cool. The output pins may provide signals from the user, a sensor, the motor control unit, or a combination thereof to one or more components of the thermal elements. For example, the output pins may provide feedback to the thermal elements to turn on a heater so that the heater increases in temperature. In another example, the thermal sensor may sense that a temperature of the thermal element has changed to be outside of a set point and the output pins may carry a signal to the thermal elements to turn on and provide heat or cool. In yet another example, the output pins may provide a signal to the thermal elements to turn on a blower, a thermoelectric device, or both so that thermal conditioning is provided to an area of interest such as a contact area (e.g., a steering wheel or a seat). The output pins may be located on a second side of a connector that is located opposite the input wires on a first side of the connector.

The connector may function to connect the electric control unit to a thermal element. The connector may house control circuitry. The connector may include one or more printed circuit boards. The connector may support one or more input wires so that the one or more input wires are fixedly connected to a printed circuit board. The one or more connectors may include one or more pieces. Preferably, the one or more connectors include two or more parts. The connector may be located within or adjacent to a contact area. The connector may be located adjacent to thermal elements. The connector may connect the electric control unit to a connector of the thermal element. The connector may be made of metal, plastic, or both. The connector may attach to a component of a vehicle. The connector may connect the electric control unit to or within a component of a vehicle so that a separate controller at a distal location is not needed. The connector may include a housing and a cover that are connected together.

The housing may function to protect a printed circuit board. The housing may connect a printed circuit board to one or more input wires and a printed circuit board to one or more output pins. Preferably, the housing connects a plurality of input wires to one or more printed circuit boards and the one or more printed circuit boards to a plurality of output pins. The housing include a printed circuit board. The housing may extend under a printed circuit board and support the input wires that are connected to the printed circuit board. The housing when connected to a cover may have a planar walls. The housing protect one or more sides, one or more edges, or both of the printed circuit board. The housing may extend under one side of the printed circuit board and around all four edges of the printed circuit board. The housing may connect to a cover.

The cover may extend over a second side of the printed circuit board. The cover may connect to the housing so that a printed circuit board and wires there between are protected and supported. The cover may lock to the housing. The cover may include one end wall (e.g., a wall at the first end of the housing that overlaps with a wall of the housing. The cover may include two opposing side walls (e.g., walls that extend from a first end towards a second end). The cover may be free of a second end wall. The cover may assist in connecting the electric control unit to a vehicle component. The cover may lock to the housing. The cover and housing may include slots and prongs that support the input wires that are connected to the printed circuit board.

The slots may receive one or more or more input wires. The housing may include one or more slots. The housing may include a plurality of slots. The housing may include four slots. The slots may function to support one or more input wires and a connection between the one or more input wires and the printed circuit board. The slots may be a recess in the housing, the cover, or both that the input wires extend through. The slots of the cover and the slots of the housing may align with each other and the input wires may extend through the slots. The slots of the cover and housing may be partial slots and when the cover and housing are combined the slots may form an aperture that is substantially the same size as the input wires. The slots seal one around a portion of a wire when the wires are inserted into the slots. Preferably, the slots when connected to the prongs form a compression fit around the wires. The size of the hole formed by the slots and prongs may be slightly smaller than the size of the input wires. For example, when the cover is connected to the housing the input wires may be compressed so that a tight connection is formed around each of the wires (e.g., a water tight connection). The slots may include an elastomeric (e.g., rubber) so that the slots are compressible. The slots may have a ledge that extends inward and supports the input wires. The slots may lock the connector on the input wires so that if the input wires are pulled the entire connector moves and the wires are prevented from being pulled out of the printed circuit board. The slots may be generally U-shaped. The slots may be located on a straight portion of the input wires. The wires may turn after the input wires extend through the slots. The slots may each hold one input wire. The slots may be alternating with one or more prongs. For example, if the connector includes four input wires then the connector and housing may each include four slots (i.e., one for each input wire). The prongs may separate each slot and input wire so that a predetermined distance is located between each input wire.

The prongs may function to laterally support each of the one or more input wires. The prongs may function to space apart each of the plurality of input wires. The prongs may lock each of the input wires in place when the input wires are extended between the housing and the cover. The prongs may be a remainder of material from the absence of material forming the slots. The prongs of the housing may align with the prongs of the cover. The prongs of the cover may overlap the prongs of the housing so that the prongs are two layers thick. The prongs may support the input wires and may assist in supporting the printed circuit board.

The printed circuit board may be supported by one or more shoulders, one or more supports, or both. The printed circuit board may have a side that is in contact with and supported by one or more shoulders, one or more supports, or both. The printed circuit board may be sandwiched between the one or more shoulders, the one or more supports, or both. The shoulders may be a platform within the housing. The supports may be a platform within the cover. The shoulders and supports may work together to prevent movement of the printed circuit board. The shoulders and supports may raise the printed circuit board so that the printed circuit board is only in contact with the shoulders and supports. The supports, the shoulders, or both may permit the input wires to extend into the housing and then into contact with the printed circuit board. The supports, the shoulders, or both may permit the input wires to enter the connector and turn so that the input wires connect to a side of the printed circuit board. The wires may be fixedly connected to the printed circuit board. The supports and the shoulders may be located on opposing sides of the printed circuit board. The supports and shoulders may oppose each other. The supports, the shoulders, or both may extend a length of the printed circuit board. The supports, the shoulders, or both may extend less than a length of the printed circuit board. The supports, the shoulders, or both may each be located proximate to opposing edges of the printed circuit board. The supports, the shoulders, or both may extend less than a length of the printed circuit board. The connector may have one or more supports and/or shoulders, two or more supports and/or shoulders, three or more supports and/or shoulders, or preferably, four or more supports and/or shoulders. The connector may be free of supports, shoulders, or both. The supports, the shoulders, or both may be located proximate to corners of the printed circuit board to support the printed circuit board. The shoulder may be an extension of the wall of the connector. The support may be an extension of a wall or a top of the cover. The shoulder may be located within the connector proximate to a recess that receives the over.

The recess may function to receive a portion of the cover. The recess may function to receive a portion of the housing. The recess may be located within the housing or the cover and may function to receive a step of the other or to extend into a step. For example, if the recess is within the cover then the step is located within the housing that receives the step of the housing. The recess may function to receive the cover or housing so that the connector has walls that are flush. The recess may have a thickness that is substantially the same as the cover, the step, the housing, or a combination thereof. The recess may be substantially the same size as the cover, the step, the housing, or a combination thereof so that the cover, the step, the housing, or a combination thereof fits within the recess to form a complementary fit. The recess may extend around one or more edges, preferably two or more edges, and more preferably three or more edges of the cover, the step, the housing, or a combination thereof. The recess may allow the cover and housing to snap together and the ledge of the step may position the cover and housing relative to each other. The recess may receive a step or extend into the step of the cover or vice versa. The recess and the step may form a complementary fit.

The step function to form a complementary fit with the recess. The step may be a portion of a wall of the cover or of the housing that extends inward. The step move the wall inward so that when the recess and step are connected together a wall of the connector is flush. The step may move inward a distance that is equal to the thickness of the recess. The step may receive the recess or vice versa. The step may include one or more locks, one or more lock recesses or both. The step may include one or more ledges.

The one or more ledges may function to prevent the cover and housing from moving relative to each other. The one or more ledges may prevent the cover from moving relative to the housing in a first direction and the locks may prevent the cover from moving relative to the housing in a second direction. The one or more ledges may be formed by a step back of the wall that forms the step. The one or more ledges may extend perpendicular to the step. The one or more ledges may create tension on the one or more locks and lock recesses so that the cover and housing remain connected.

The one or more locks may function to connect the housing and cover together to form a connector. The one or more locks be flexible to form a connection. The one or more locks may be tapered so that a one way connection may be formed. The one or more locks may assist a cover in sliding over the locks so that the one or more locks expand the cover as the cover is moved towards the ledge and then the locks may drop into the lock recesses. The locks may be triangular shape. The locks may be flexible. The locks may be solid. The locks may have a cantilever connection with the cover, the housing, or both. The cover, the housing, or both may include one or more locks. The cover, the housing, or both may include one more locks on each side or each edge. Preferably, the cover, the housing, or both include two or more locks in each side or each edge. The locks may be located on the step, the recess, or both. The locks may extend into a lock recess and the locks may include a flat wall that prevents the locks from being removed from the lock recess.

The one or more lock recesses may function to form a mating relationship with a lock to connect a cover to a housing. The one or more lock recesses may be a through hole in a wall of the cover, the housing, or both. The one or more lock recesses may be a through hole in the step, the recess, or both. The one or more lock recesses may be an indentation, a through hole, or both. The one or more lock recesses may receive an entire lock. The one or more lock recesses may prevent the cover from moving relative to the housing. The one or more lock recesses may contact a flat wall of a lock so that the lock cannot be removed from the lock recess. Preferably, the lock recesses are located in the cover and the locks are located in the housing. More preferably, the lock recesses are located in the recess of the cover and the locks are located on the step of the housing. The cover, the housing, or both may include one or more lock recesses. The cover, the housing, or both may include one more lock recesses on each side or each edge. Preferably, the cover, the housing, or both include two or more lock recesses in each side or each edge. The lock recesses and the locks may form a complementary fit. The locks and the lock recesses may form a connection so that the shoulders and supports hold the printed circuit board in place. The one or more locks and the one or more lock recesses function to lock printed circuitry with the connector.

The control circuitry functions to control one or more thermal elements. The control circuitry may control a temperature. The control circuitry may control a blower speed. The control circuitry may control a resistive heater. The control circuitry may control a thermoelectric device. The control circuitry may turn a thermal element on, turn a thermal element off, or both. The control circuitry may monitor an occupant (e.g., if an occupant is in a seat, if an occupant is holding a steering wheel, or both). The control circuitry may receive information from a user control and transmit the information to a thermal element. The control circuitry may control a temperature of a thermal element using pulse width modulation. The control circuitry may include or be connected to a thermal sensor. The control circuitry may control a single thermal element. The control circuitry may control multiple thermal elements (e.g., a fan and a thermoelectric device). The control circuitry may include one or more voltage regulators, one or more LIN transceivers, one or more pulse width modulation controllers (PWM), one or more motor control units, or more zener diodes, schottky diodes, diodes, reverse polarity diodes, timers, current sensors, LSD, printed circuitry board, or a combination thereof.

The printed circuit board functions to include all of the circuit elements and connect the circuit elements to a power source, a signal source, or both. The printed circuit board may connect the circuit elements within connector so that an electric control unit is formed. The printed circuit board may include surface mounted circuitry, through hole circuitry, or both. The printed circuit board may connect output pins to input wires. The printed circuit board rest on one or more shoulders, one or more supports, or both. The printed circuit board may be sandwiched between the shoulders, the supports, or both. The printed circuit board may receive input signals, process the input signals, and then provide input to the thermal elements so that the thermal elements provide the desired thermal output. The printed circuit board may include one or more motor control units.

The one or more motor control units function to control one or more thermal elements. The one or more motor control units may turn on and off a resistive heater, a fan motor, a thermoelectric device, or a combination thereof. The one or more motor control units may receive an input signal and then based upon the input signal control the thermal element. For example, if a user desires a certain temperature the motor control unit may monitor the temperature provided by a thermal sensor and then provide feedback to a pulse width modulation unit that turns the thermal element on and off as needed.

Figure 1:
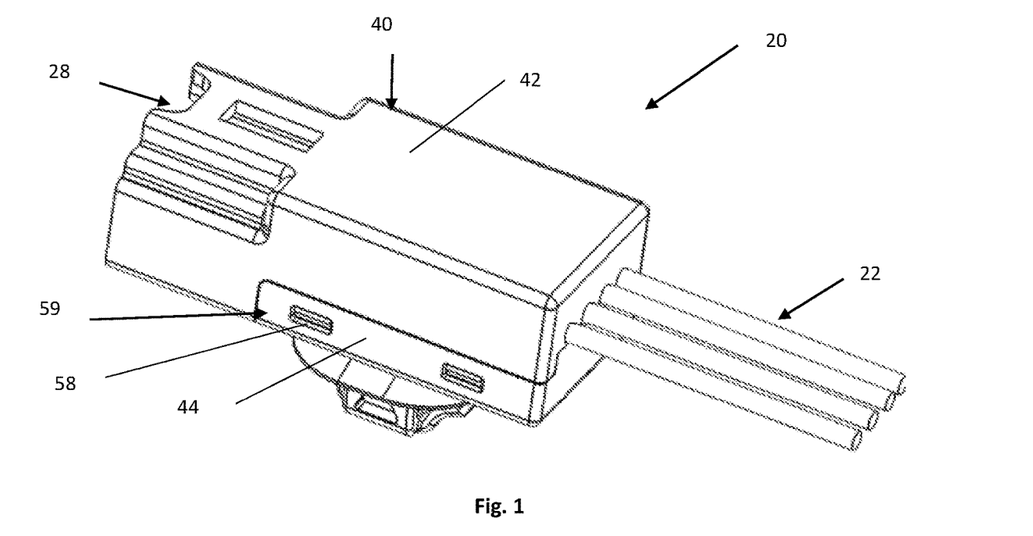
FIG. 1 illustrates a top perspective view of the electric control unit.

FIG. 1 illustrates a perspective view of an electronic control unit 20 in an assembled state. The electric control unit 20 includes input wires 22 and output pins 28 so that the electric control unit 20 can connect a power source to a thermal element (not shown). The electric control unit 20 includes a connector 40 with a housing 42 and a cover 44 that connect together. The cover 44 includes a plurality of lock recesses 59 that receive the locks 58 of the housing 42 so that the housing 42 and cover 44 are connected together. The housing 42, alone or in combination with the cover 44, can form a connector structure such as plug or socket associated with the output pins 28.

Figure 2:
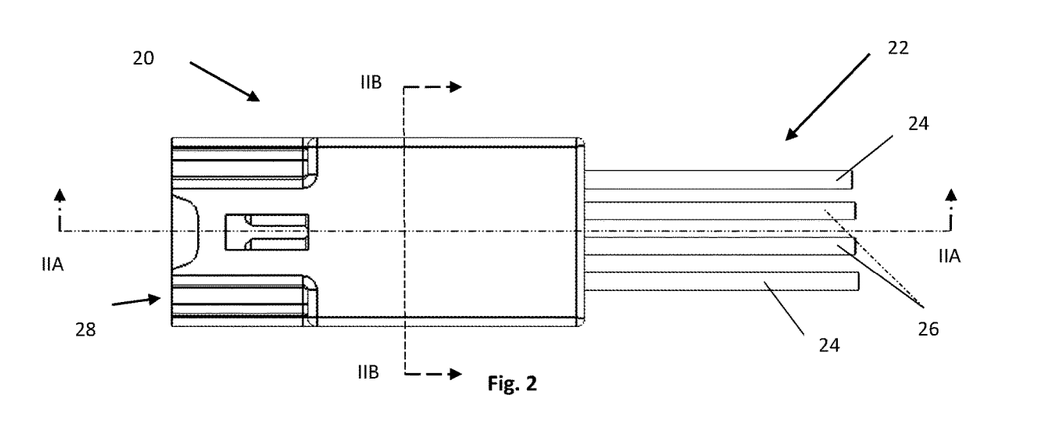
FIG. 2 illustrates a bottom view of the electric control unit.

FIG. 2 is a bottom view of the electric control unit 20 in an assembled state. The input wires 22 extending into the electric control unit 20 have a pair of power wires 24 that are located on opposing sides of signal wires 26. The output pins 28 are connected to the input wires 22 via the control circuitry (not shown) to provide power and signals to thermal elements (not shown).

Figure 2A:
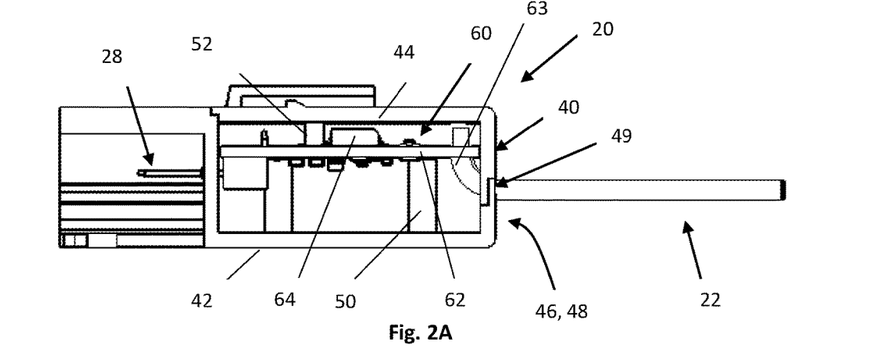
FIG. 2A illustrates a longitudinal cross-sectional view of FIG. 2 cut along line IIA-IIA.

FIG. 2A illustrates a longitudinal cross-sectional view of an electric control unit 20 of FIG. 2 cut along line IIA-IIA. The electric control unit 20 includes a connector 40 having a housing 42 and a cover 44 with control circuitry 60 located between the housing 42 and the cover 44. The output pins 28 extend through a connector 40 on a second end so that the output pins 28 can connect the electric control unit 20 to a thermal element (not shown) and input wires 22 extend through the connector 40 on a first end to provide power and signals to the printed circuit board 62. The first end includes slots 46 that the input wires 22 extend through. The slots 46 are separated by prongs 48. The slots 46 and prongs 48 can cooperate to form apertures within which the wires are supported and optionally clamped and sealed around their periphery (e.g., by compression). The slots 46 and prongs 48 when connected form a housing support 49 that supports the input wires 22. The input wires 22 are also connected to the printed circuit board 62 forming a wire support 63 that supports an end of the input wires 22. As shown, the input wires 22 above the printed circuit board 62 are stripped of a dielectric covering so that the input wires 22 can conduct power or a signal, thus, the cross-section below the printed circuit board 62 is greater than the cross-section above the printed circuit board 62. The wire support 63 and the housing support 49 work together to maintain a position of the input wires 22 within the housing 42. The output pins 28 are connected to a printed circuit board 62 including a motor control unit 64. The printed circuit board 62 is located on and supported on a bottom side by a shoulder 50. The input wires 22 are fixedly connected to the printed circuit board 62. The cover 44 includes supports 52 located on a top side of the printed circuit board 62 so that the printed circuit board 62 is sandwiched between the supports 52 and the shoulder 50.

Figure 2B:
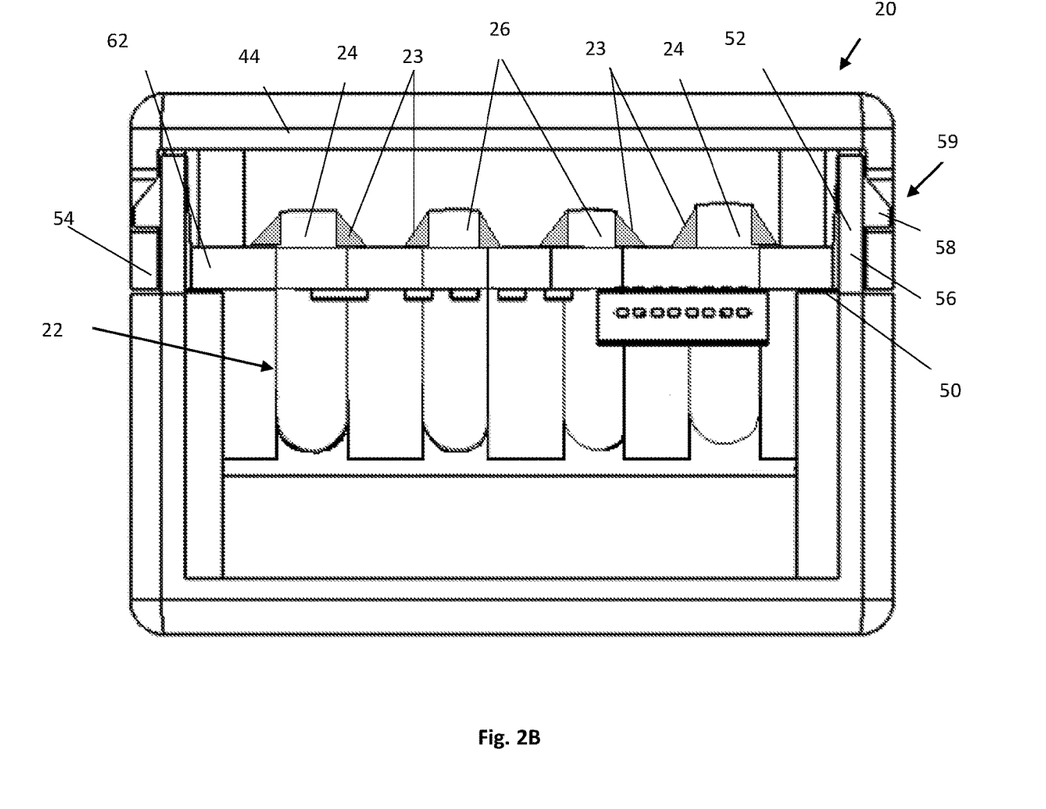
FIG. 2B illustrates width cross-sectional view of FIG. 2 cut along line IIB-IIB.

FIG. 2B illustrates a cross-sectional view of a width of the electric control unit 20 of FIG. 2 cut along line IIB-IIB. The electric control unit 20 includes a connector 40 including a housing 42 and a cover 44 with a printed circuit board 62 located therebetween. The printed circuit board 62 is sandwiched between a shoulder 50 of the housing 42 and the supports 52 of the cover 44. The printed circuit board 62 is connected to a plurality of input wires 22 by solder 23 that connects to the bare wire above the printed circuit board 62 while the input wires 22 below the printed circuit board 62 are covered by a dielectric covering. The input wires 22 include power wires 24 located outside of signal wires 26.

The cover 44 includes a lock recess 59 that receives a lock 58 of the housing 42 to connect the cover 44 and housing 42 together. The cover 44 includes a recess 54 that extends into a step 56 of the housing 42 so that the cover 44 and housing 42 are flush.

Figure 3:
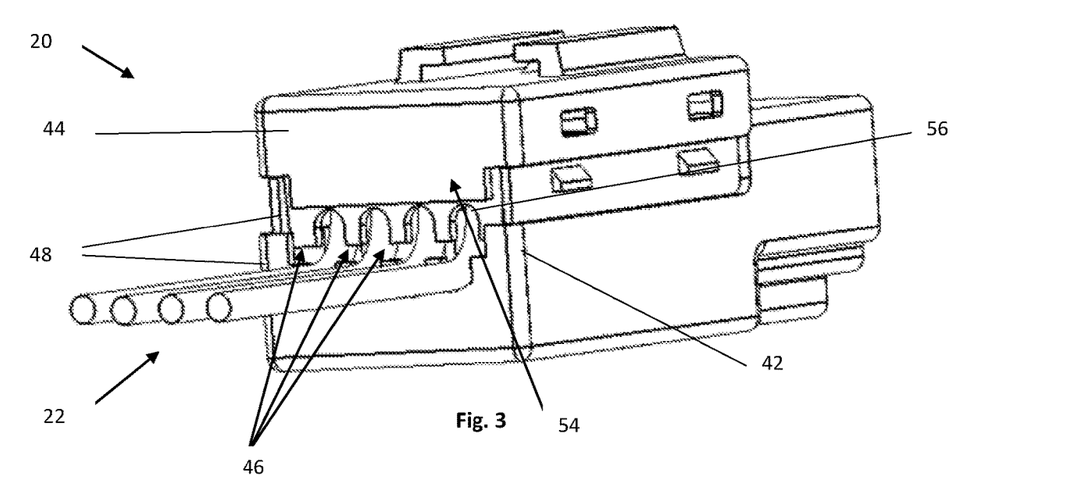
FIG. 3 illustrates a rear perspective view of an electric control unit where the housing and cover are partially separated.

FIG. 3 is a rear end view of the electric control unit 20. The electric control unit 20 has the housing 42 and cover 44 partially split apart so that slots 46 and prongs 48 are visible in the housing 42 and cover 44. The prongs 48 of the cover 44 extend into the slots 46 of the housing 42 and vice versa forming a complementary fit so that when the input wires 22 extend through the slots 46 the input wires are at least partially supported by being sandwiched between the prongs 48 and slots 46. The housing 42 includes a step 56 that receives a recess 54 of the cover 44 forming a complementary fit so that the cover 44 and housing 42 connect together and the electric control unit 20 has a continuous wall.

Figure 4:
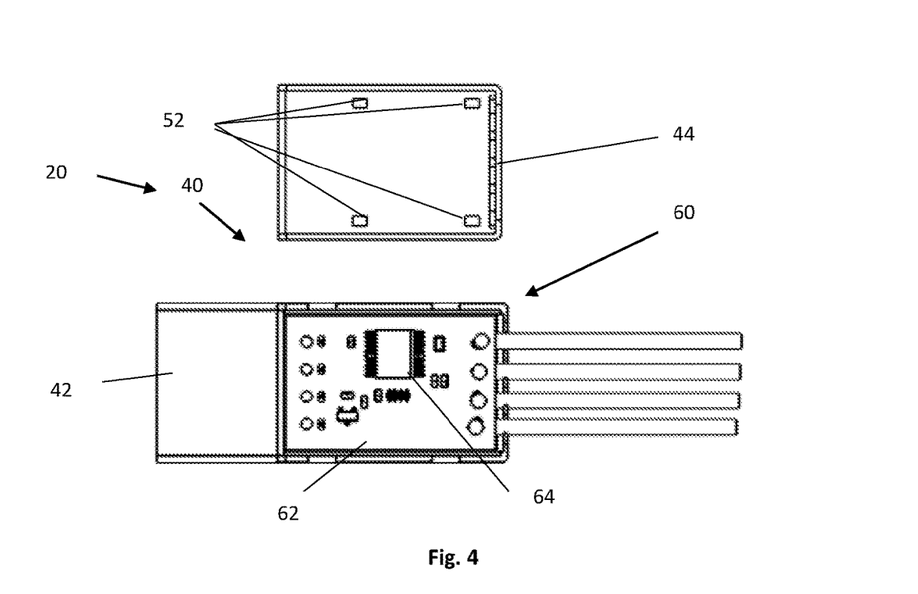
FIG. 4 illustrates a top view of the housing and cover with the cover removed from the housing.

FIG. 4 is a partial exploded view of the electric control unit 20 with the cover 44 removed from the housing 42. The cover 44 includes supports 52 that contact a printed circuit board 62 when the cover 44 and housing 42 are connected together so that the printed circuit board 62 is held on the shoulders (not shown). The connector 40 of the electric control unit 20 includes a housing 42 that holds control circuitry 60 including the printed circuit board 62 and motor control unit 64.

Figure 5:
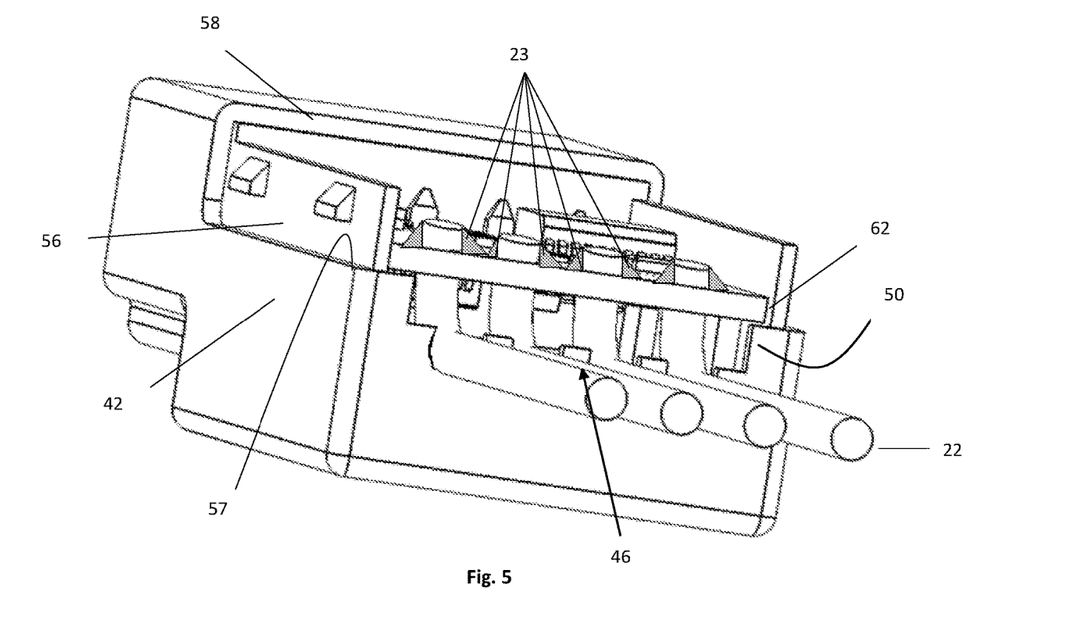
FIG. 5 illustrates a rear perspective view of the connector with the cover removed.

FIG. 5 illustrates an end perspective view of the housing 42 with the input wires 22 extending through the slots 46 so that the slots 46 support the input wires 22 below the printed circuit board 62. The input wires 22 are connected to the printed circuit board 62 via solder 23. The printed circuit board 62 rests on shoulders 50 of the housing 42 and the input wires 22 extend below the printed circuit board 62 and connect to the printed circuit board 62. The housing 42 includes a step 56 for receiving a portion of the cover (not shown) so that the cover and housing 42 form a flush connection. The step 56 includes a ledge 57 so that the cover seats on the step 56. The step 56 includes locks 58 that extend into lock recesses (not shown) in the cover so that the cover and housing 42 are connected together.

Figure 6:
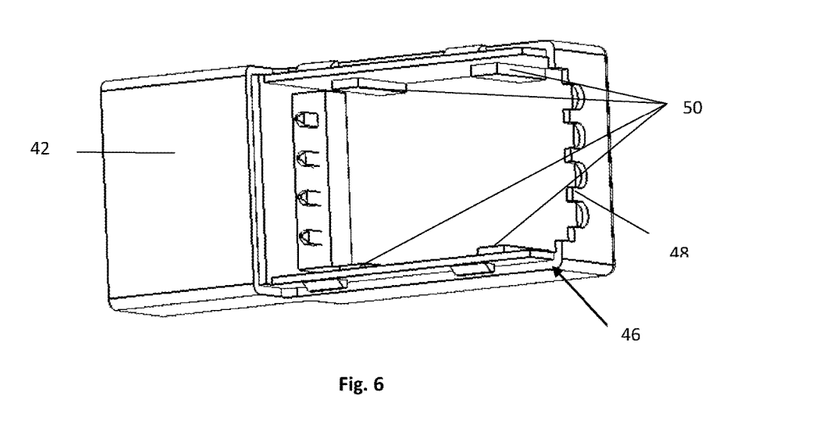
FIG. 6 illustrates a top view of the housing with the cover and printed circuit board removed.

FIG. 6 illustrates the housing 42 with the printed circuit board removed so that the shoulders 50 are visible. The slots 46 and prongs 48 are located below the shoulders 50 so that a printed circuit board when installed rests above the slots 46.

Figure 7:
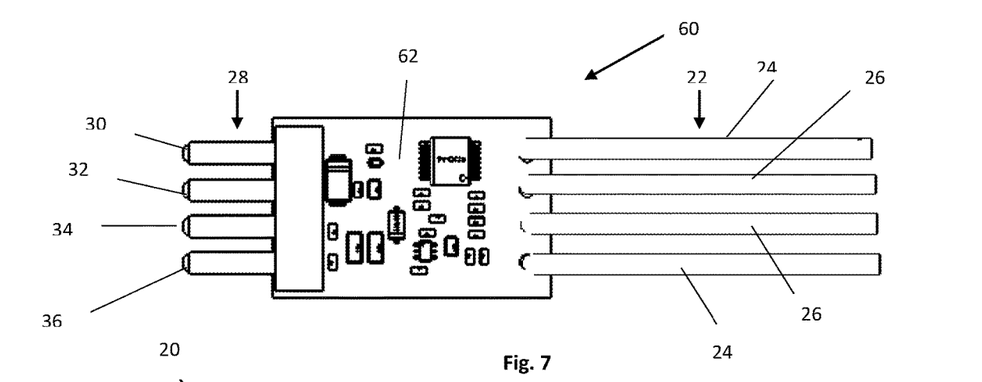
FIG. 7 is a top view of the wiring connected to the printed circuit board.

FIG. 7 illustrates a top view of the control circuitry 60. The control circuitry 60 has output pins 28 on a first side and input wires 22 on a second side. The input wires 22 include a pair of power wires 24 that are located on separate edges of the printed circuit board 62 with a plurality of signal wires 26 that extend between the power wires 24. The output wires 28 include a power or ignition wire (IGN) 30, a local interconnect network wire (LIN) 32, a pulse width modulation wire (PWM) 34, and a ground wire (GND) 36.

Figure 8:
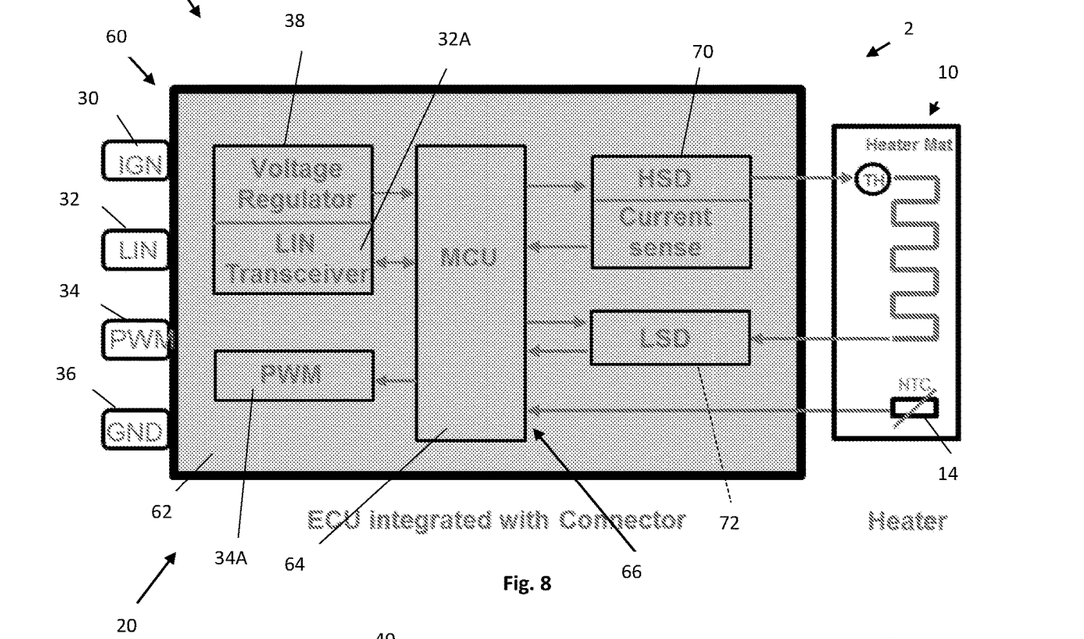
FIG. 8 illustrates circuitry of the electric control unit connected to a thermal element.

FIG. 8 schematically illustrates a circuit layout of the control circuitry 60 of the electric control unit 20 with the electric control unit being connected to a thermal element 10 so that a thermal conditioning system 2 is formed. A thermal sensor 14 is in communication with the thermal element 10 and a motor control unit 64 of the electric control unit 20 so that a temperature of the thermal element 10 is controlled during operation. The thermal sensor provides a signal to a signal receiver 66 within the motor control unit 64. The thermal element 10 is connected to a high side current sensor 70 and a low side current sensor 72 that assists in regulating the thermal element 10 through communication with the motor control unit 64. The motor control unit 64 is in communication with a voltage regulator 38 a LIN transceiver 32A and a pulse width modulation device 34A that assist in regulating the thermal element 10. An ignition wire 30 and a ground wire 36 supply power to the printed circuit board 62 and control circuitry 60, and the local interconnect network wires 32 and pulse width modulation wires 34 supply signals to the LIN transceiver 32A and the pulse width modulation device 34A respectively.

Figure 9:
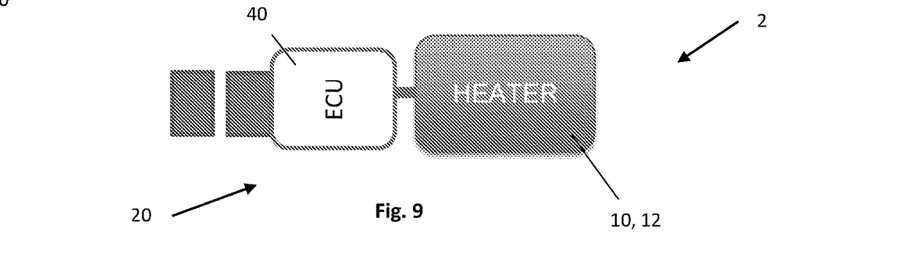
FIG. 9 illustrates a thermal conditioning system with a thermal element connected to the electric control unit.

FIG. 9 illustrates a thermal conditioning system 2. The thermal conditioning system 2 includes a thermal element 10, which is a heater 12 that is electrically connected to an electric control unit 20 with a connector 40 that powers and controls the thermal element 10.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints. About is intended to cover a listed number ±5%. Thus, "about 10" is intended to cover 9.5 to 10.5.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. By use of the term "may" herein, it is intended that any described attributes that "may" be included are optional.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

ELEMENT LIST

2 Thermal conditioning System
10 Thermal element
12 Heater
14 Thermal sensor
20 Electric Control Unit
22 Input wires
23 Solder
24 Power wires
26 Signal wires
28 Output pins
30 IGN (Ignition)
32 LIN (Local interconnect network)
32A local interconnect network transceiver
34 PWM Wire (Pulse width Modulation)
34A PWM device
36 GND (Ground)
38 Voltage regulator
40 Connector
42 Housing
44 Cover
46 Slots
48 prongs
49 Housing support
50 Shoulder
52 support
54 recess
56 step
57 ledge
58 lock
59 Lock recesses
60 Control Circuitry
62 Printed circuit board
63 Wire Support
64 Motor control unit
66 Signal Receiver
70 High side current sensing
72 Low side current sensing

We claim:

1. An electric control unit comprising:
  a. a plurality of input wires that include one or more power wires and one or more signal wires;
  b. a connector receiving the plurality of input wires on a first side of the connector, the first side of the connector including:
    i. a plurality of slots that each receive one of the plurality of input wires, and
    ii. a plurality of prongs having an alternating relationship with the plurality of slots so that the plurality of prongs and the plurality of slots support each of the plurality of input wires; and
  c. control circuitry located within the connector and connected to each of the plurality of input wires; and
  d. a plurality of output pins located on a second side of the connector that are configured to connect to a thermal element, wherein the electric control unit assists in powering the thermal element and controlling the thermal element, and wherein the plurality of output pins comprise: a power wire, a local interconnect network wire, a pulse width modulation wire, and a ground wire.

2. The electric control unit of claim 1, wherein the connector includes a housing and a cover that are separable, and the housing and the cover each include the plurality of slots and the plurality of prongs.

3. The electric control unit of claim 2, wherein the plurality of slots in the housing align with the plurality of prongs in the cover so that when one of the plurality of input wires is inserted into one of the plurality of slots in the housing, one of the plurality of prongs of the cover extend into the one of the plurality of slots and into contact with the one of the plurality of input wires supporting the one of the plurality of wires.

4. The electric control unit of claim 3, wherein the plurality of slots are located under one or more printed circuit boards of the control circuitry so that the plurality of input wires extend through the plurality of slots and into contact with an under side of the one or more printed circuit boards.

5. The electric control unit of claim 2, wherein the housing includes one or more shoulders that support one or more printed circuit board of the control circuitry, wherein the cover includes a plurality of supports that contact the one or more printed circuit boards when the cover is connected to the housing.

6. The electric control unit of claim 5, wherein the one or more printed circuit boards are sandwiched between the plurality of supports and the one or more shoulders.

7. The electric control unit of claim 2, wherein the cover includes a recess that receives a step of the housing or the housing includes a recess that receives a step of the cover so that an outside wall of the cover and housing are flush when connected together.

8. The electric control unit of claim 2, wherein the housing includes a lock that extends into a lock recess of the cover or the housing includes a lock recess that receives a lock of the cover so that the cover and the housing are connected together.

9. The electric control unit of claim 1, wherein the plurality of input wires include two or more power wires and two or more signal wires and the two or more signal wires are located between the two or more power wires.

10. The electric control unit of claim 1, wherein the electric control unit is connected to a heater, and the heater is located within a steering wheel, a seat of an automobile, or a vehicle floor mat.

11. The electric control unit of claim 9, wherein the two or more signal wires provide one or more signals to the electric control unit.

12. The electric control unit of claim 11, wherein the plurality of output pins provide power and signals to the thermal element, the thermal element is a heater located within a steering wheel, a seat of an automobile, or a vehicle floor mat.

13. The electric control unit of claim 1, wherein one of the plurality of input wires is an ignition wire.

14. The electric control unit of claim 4, wherein the plurality of input wires are soldered to the one or more printed circuit boards.

15. The electric control unit of claim 2, wherein the plurality of prongs of the cover overlap the plurality of prongs of the housing so that the plurality of prongs are two layers thick.

* * * * *